March 25, 1930.  E. MUHLHOFF  1,752,262

BIT FOR BORING LONG HOLES

Filed April 22, 1929

Inventor.

Edward Muhlhoff

By Emery, Booth, Varney & Holcombe his Attorneys

Patented Mar. 25, 1930

1,752,262

UNITED STATES PATENT OFFICE

EDUARD MUHLHOFF, OF REMSCHEID, GERMANY, ASSIGNOR TO FIRM OF PETER FRIEDR. MUHLHOFF, WERKZEUGFABRIK, OF REMSCHEID, GERMANY

BIT FOR BORING LONG HOLES

Application filed April 22, 1929, Serial No. 357,276, and in Germany September 20, 1928.

In bits for boring long holes as heretofore known the cutting edges and the bit body are subjected to an extraordinarly high strain. As a result it frequently happens that the cutting edges become broken or the bit body itself breaks.

The present invention aims to relieve these difficulties, and to accomplish this end at least one of the cutting elements of the bit is provided with notches, teeth, or the like. This element thus cuts tooth-like grooves in the material to be bored, the projections of which are then pared off by the following cutters of the borer. Thus the strain is considerably reduced, and likelihood of breakage is minimized.

For illustration, the invention is shown in the drawings in a form more especially designed for boring wood, whereof:

Figure 1:
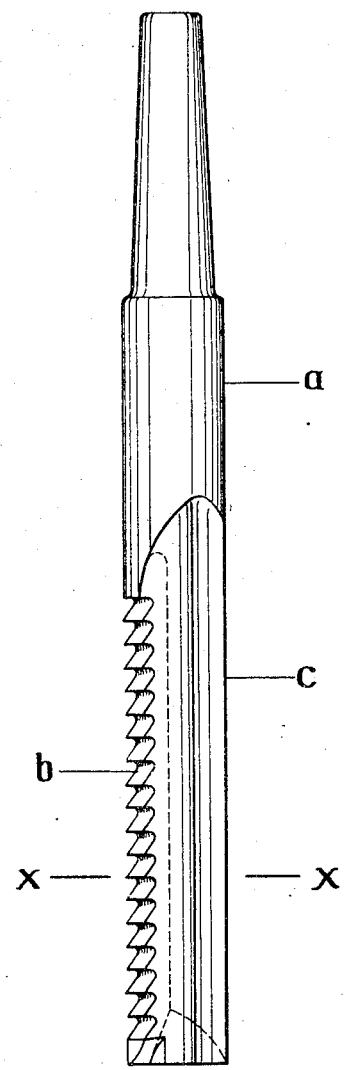
Fig. 1 shows a bit with two cutting edges, or cutters.
Figure 2:
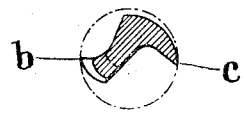
Fig. 2 shows a section taken on line x—x of Fig. 1.

In the exemplary embodiment illustrated in Figs. 1 and 2, the bit a is provided with a saw-tooth-like cutter b and a smooth cutter c. Upon rotation of the bit in the bore hole the cutter b bites a series of grooves in the wood, the cross sections of which correspond to the shape of the saw-tooth-like cutter, so that tooth-like formations result in the wood, the projections of which can be readily removed by the unbroken smooth cutter c.

As is clearly shown in the drawings the cutting edges are properly relieved by backing off their rear sides, and the cutters have an appreciable rake, these features being clearly shown in Fig. 2 and being well understood in the art.

It will be appreciated that the embodiment shown provides the maximum space between the cutters to receive the relatively large chips. As many as four cutting blades, spaced 90° apart, can be used and still maintain a sufficient chip receiving space for many types of work, but the embodiment comprising but two blades, as shown, is thought to be the best.

It is obvious that the notches which subdivide the cutters in the manner described may also be used in other forms of bits for boring long holes, as for example, those having twisted grooves, whereby a similar improved operation may be obtained. I accordingly do not desire to be limited to the specific embodiments shown and described, but define my invention by the following claim.

What I claim is:

A bit for boring long holes comprising a shank and a relatively long working portion provided with two distinctly different types of cutting edges arranged longitudinally thereof, spaced circumferentially at least 90°, and comprising, respectively, a preliminary notching or chip dividing means and a finish cutter, said notching or chip dividing means being made up of a pluralty of relieved serrated teeth having perceptible rake and said finish cutter being made up of a continuous relieved, smooth cutting edge, so that strain on the cutting edges and working portion of said bit and consequent danger of breakage thereof will be reduced.

In testimony whereof, I have signed my name to this specification.

EDUARD MUHLHOFF.